United States Patent [19]

Nezu et al.

[11] Patent Number: 5,996,748
[45] Date of Patent: Dec. 7, 1999

[54] DAMPING FORCE ADJUSTING TYPE HYDRAULIC SHOCK ABSORBER

[75] Inventors: Takashi Nezu, Tokyo; Akira Kashiwagi, Kanagawa-ken, both of Japan

[73] Assignee: Tokico Ltd., Kanagawa-ken, Japan

[21] Appl. No.: 08/814,905

[22] Filed: Mar. 12, 1997

[30] Foreign Application Priority Data

Mar. 19, 1996 [JP] Japan .................................. 8-090148

[51] Int. Cl.$^6$ ...................................................... F16F 5/00
[52] U.S. Cl. .................... 188/313; 188/266.5; 188/282.2
[58] Field of Search ............................. 188/266.6, 266.5, 188/282.2, 282.4, 316, 317, 318, 319.1, 322.13, 313

[56] References Cited

U.S. PATENT DOCUMENTS

| | | | |
|---|---|---|---|
| 4,958,705 | 9/1990 | Horvath | 188/318 X |
| 4,986,393 | 1/1991 | Preukschat et al. | 188/318 X |
| 5,328,004 | 7/1994 | Fannin et al. | 188/318 |
| 5,375,683 | 12/1994 | Huang et al. | 188/318 X |
| 5,586,627 | 12/1996 | Nezu et al. | 188/318 X |
| 5,655,633 | 8/1997 | Nakadate et al. | 188/318 X |
| 5,730,261 | 3/1998 | Spakowski et al. | 188/316 X |

FOREIGN PATENT DOCUMENTS 31 32 434 A1  2/1983  Germany .
41 24 139 C1  6/1992  Germany .

Primary Examiner—Robert J. Oberleitner
Assistant Examiner—Pamela J. Lipka
Attorney, Agent, or Firm—Wenderoth, Lind & Ponack, L.L.P.

[57] ABSTRACT

A piston is slidably fitted in a cylinder for dividing the interior of the cylinder into upper and lower cylinder chambers. A reservoir is connected to the piston. A primary passage communicates between the upper cylinder chamber and the reservoir. The primary passage includes a primary damping valve. A secondary passage is connected to the primary passage to bypass the primary damping valve. A constant orifice, a filter, and a damping force adjusting valve are provided in the secondary passage. The primary damping valve includes a pilot line. The pilot line is connected downstream of the filter. The flow resistance of the damping force adjusting valve is directly adjusted by changing the cross sectional flow area of the damping force adjusting valve. The valve opening pressure of the primary damping valve is adjusted by changing the pilot pressure introduced from the pilot line. When the filter becomes clogged, the primary passage ensures the flow of the hydraulic fluid. The pilot pressure is then lowered so that the valve opening pressure of the primary damping valve is lowered to keep the damping force suitably low.

20 Claims, 4 Drawing Sheets

DAMPING FORCE ADJUSTING TYPE HYDRAULIC SHOCK ABSORBER

BACKGROUND OF THE INVENTION

1. Field of the Invention

The present invention relates to a damping force adjusting type hydraulic shock absorber mounted on a suspension system and the like of a vehicle such as an automobile.

2. Description of the Related Art

A hydraulic shock absorber mounted on a suspension system of a vehicle such as an automobile typically comprises: a cylinder containing hydraulic fluid sealed therein; a piston slidably fitted in the cylinder for dividing the interior of the cylinder into a first chamber and a second chamber; a piston rod including one end connected to the piston and an opposite end extending through the first chamber out of the cylinder; and a hydraulic fluid passage having a damping force generating mechanism (orifice, disc valve, and so on) for communicating between the first and second chambers. The movement of the piston associated with the extension and contraction of the piston rod allows the hydraulic fluid to flow in the hydraulic fluid passage. The damping force generating mechanism controls the flow of the hydraulic fluid in the hydraulic fluid passage to generate a damping force against the extension and contraction of the piston rod.

Long term use of the hydraulic shock absorber results in wear of sliding parts such as the piston, the piston rod, and so on with the result that metal powder created by the wear enters the hydraulic fluid within the cylinder. Long term use also results in other foreign matter entering the hydraulic fluid within the cylinder from the outside. Such metal powder and other foreign matter hastens the wear of the sliding parts and may cause mechanical failure of the damping force generating mechanism. Therefore, a hydraulic shock absorber is provided in which a filter is located in the hydraulic fluid passage to filter foreign matter present in the hydraulic fluid (Japanese Patent Public Disclosure No. 2-31037).

However, a hydraulic shock absorber in which such a filter is provided only in the hydraulic fluid passage has the following defects. Namely, if the filter becomes clogged for some reason, the flow resistance of the hydraulic fluid passage suddenly increases to excessively increase the damping force of the hydraulic shock absorber, with a resulting deterioration in vehicle handling. In addition, it may excessively increase the pressure of the hydraulic fluid upstream of the filter and damage the filter.

Since the filter consists of a fine mesh or a porous material such as a sintered metal and the like, the flow resistance of the filter itself is susceptible to the viscosity of the hydraulic fluid. Thus, when the viscosity of the hydraulic fluid is raised at low temperature, the flow resistance of the filter increases, thereby excessively increasing the damping force of the hydraulic shock absorber with a resulting deterioration in vehicle handling. Such an increase in damping force is restrained to some extent by sufficiently increasing the effective area of the filter. However, due to space construction, the advantages of such a construction are limited.

SUMMARY OF THE INVENTION

In view of the drawbacks of the above related arts, it is an object of the present invention to provide a hydraulic shock absorber which can prevent an excessive increase in damping force caused by filter clogging and by increased viscosity in the hydraulic fluid.

To this end, the present invention provides a damping force adjusting type hydraulic shock absorber comprising: a cylinder having a plurality of working chambers containing hydraulic fluid sealed therein; a piston slidably fitted in the cylinder; a piston rod including one end connected to the piston and an opposite end extending out of the cylinder; a primary passage for communicating between the working chambers; a primary damping valve provided in the primary passage; a secondary passage for communicating between the working chambers so that the hydraulic fluid flows therebetween in one direction by sliding movement of the piston; a damping force adjusting valve provided in the secondary passage; and a filter provided in the secondary passage.

By employing the above construction, sliding movement of the piston associated with the extension and contraction of the piston rod allows the hydraulic fluid to flow in the primary passage and the secondary passage. The primary damping valve controls the flow of the hydraulic fluid in the primary passage to generate a damping force. The damping force generating mechanism controls the flow of the hydraulic fluid in the secondary passage to generate a damping force. The damping force is adjusted by changing the flow resistance of the damping force adjusting valve. The hydraulic fluid then flows in the secondary passage in one direction, and foreign matter in the hydraulic fluid is held back by the filter. Even if the filter becomes clogged, the primary passage ensures the flow of the hydraulic fluid between the working chambers.

According to an embodiment of the present invention, the secondary passage includes an extending side secondary passage for allowing the hydraulic fluid to flow in one direction when the piston rod is in an extending stroke and a contracting side secondary passage for allowing the hydraulic fluid to flow in the same direction when the piston rod is in a compressing stroke. The damping force adjusting valve and the filter are provided in the extending side secondary passage and the contracting side secondary passage.

By employing the above construction, the damping force adjusting valve changes the flow resistance of the extending side secondary passage and that of the contracting side secondary passage to adjust the extending side damping force and the contracting side damping force, respectively.

The present invention also provides a damping force adjusting type hydraulic shock absorber comprising: a cylinder having a plurality of working chambers containing hydraulic fluid sealed therein; a piston slidably fitted in the cylinder; a piston rod including one end connected to the piston and an opposite end extending out of the cylinder; a primary passage for communicating between the working chambers so that the hydraulic fluid flows therebetween in one direction by sliding movement of the piston; a pilot type primary damping valve for controlling the flow of the hydraulic fluid in the primary passage to generate a damping force and for adjusting the damping force in response to a change in pilot pressure; a secondary passage connected to the primary passage to bypass the pilot type primary damping valve; a constant orifice provided upstream of the secondary passage; a variable orifice provided downstream of the secondary passage; the pilot type primary damping valve including a pilot line connected to the secondary passage between the constant orifice and the variable orifice; and a filter provided upstream of the portion of the secondary passage to which the pilot line is connected.

By employing the above construction, sliding movement of the piston associated with the extension and contraction of the piston rod allows the hydraulic fluid to flow in the primary and secondary passages. The pilot type primary damping valve controls the flow of the hydraulic fluid in the primary passage to generate a damping force. The variable orifice controls the flow of the hydraulic fluid in the secondary passage to generate a damping force. The flow resistance of the secondary passage is directly adjusted by changing the cross sectional flow area of the variable orifice. The flow resistance of the primary passage is adjusted by changing the pilot pressure of the pilot type primary damping valve. The hydraulic fluid then flows in the secondary passage in one direction, and the foreign matter in the hydraulic fluid is held back by the filter. Even if the flow resistance of the filter excessively increases, the primary passage ensures the flow of the hydraulic fluid between the working chambers, and the pilot pressure is lowered to decrease the flow resistance of the primary passage.

The present invention also provides a damping force adjusting type hydraulic shock absorber comprising: a cylinder including a plurality of working chambers containing hydraulic fluid sealed therein; a piston slidably fitted in the cylinder; and a piston rod including one end connected to the piston and an opposite end extending out of the cylinder. An extending side primary passage for communicates between the working chambers so that the hydraulic fluid flows therebetween in one direction by sliding movement of the piston when the piston rod is in an extending stroke. An extending side pilot type primary damping valve controls the flow of the hydraulic fluid in the extending side primary passage to generate a damping force and adjusts the damping force in response to a change in pilot pressure. An extending side secondary passage connected to the extending side primary passage bypasses the extending side pilot type primary damping valve. An extending side constant orifice is provided upstream of the extending side secondary passage; an extending side variable orifice provided downstream of the extending side secondary passage. A contracting side primary passage allows the hydraulic fluid to flow in one direction by sliding movement of the piston when the piston rod is in a compressing stroke. A contracting side pilot type primary damping valve controls the flow of the hydraulic fluid in the contracting side primary passage to generate a damping force and adjusts the damping force in response to a change in pilot pressure. A contracting side secondary passage connected to the contracting side primary passage bypasses the contracting side pilot type primary damping valve. A contracting side constant orifice is provided upstream of the contracting side secondary passage, and a contracting side variable orifice is provided downstream of the contracting side secondary passage extending side pilot type primary damping valve includes an extending side pilot line connected to the extending side secondary passage between the extending side constant orifice and the extending side variable orifice. The contracting side pilot type primary damping valve includes a contracting side pilot line connected to the contracting side secondary passage between the contracting side constant orifice and the contracting side variable orifice. An extending side filter is provided upstream of the portion of the extending side secondary passage to which the extending side pilot line is connected and a contracting side filter is provided upstream of the portion of the contracting side secondary passage to which the contracting side pilot line is connected.

By employing the above construction, sliding movement of the piston associated with the extension and contraction of the piston rod allows the hydraulic fluid to flow in the extending side primary passage, the contracting side primary passage, the extending side secondary passage, and the contracting side secondary passage, respectively. The extending side pilot type primary damping valve controls the flow of the hydraulic fluid in the extending side primary passage to generate a damping force. The contracting side pilot type primary damping valve controls the flow of the hydraulic fluid in the contracting side primary passage to generate a damping force. The extending side variable orifice controls the flow of the hydraulic fluid in the extending side secondary passage to generate a damping force. The contracting side variable orifice controls the flow of the hydraulic fluid in the contracting side secondary passage to generate a damping force. The flow resistance of the extending side secondary passage is directly adjusted by changing the cross sectional flow area of the extending side variable orifice. The flow resistance of the contracting side secondary passage is directly adjusted by changing the cross sectional flow area of the contracting side variable orifice. The flow resistance of the extending side primary passage is adjusted by changing the pilot pressure of the extending side pilot type primary damping valve. The flow resistance of the contracting side primary passage is adjusted by changing the pilot pressure of the contracting side pilot type primary damping valve. Since the hydraulic fluid then flows in the extending side and contracting side secondary passages in one direction, the foreign matter in the hydraulic fluid is held back by the filter. Even if the flow resistance of the filter is excessively increased, the extending side and contracting side primary passages ensure the flow of the hydraulic fluid between the working chambers, and the pilot pressure is lowered to decrease the flow resistance of the extending side and contracting side primary passages.

Other features and advantages of the present invention will become apparent to those skilled in the art upon review of the following detailed description, claims and drawings.

Figure 1:
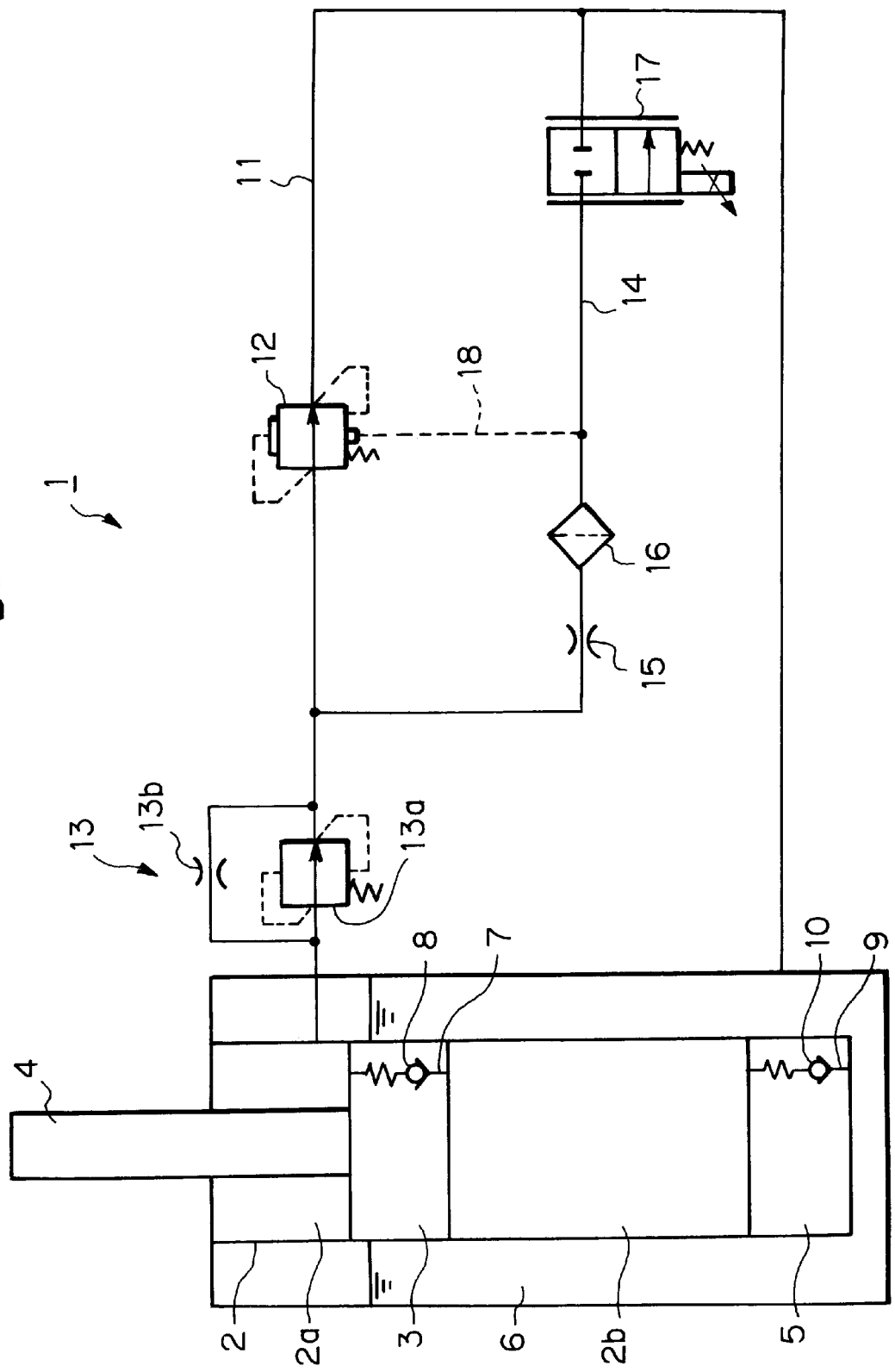
FIG. 1 is a hydraulic circuit diagram according to a first embodiment of the present invention.

Before embodiments of the present invention are explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE PREFERRED EMBODIMENTS

Embodiments of the present invention will be described below in detail with reference to the accompanying drawings.

A first embodiment of the damping force adjusting type hydraulic shock absorber according to the present invention will be described with reference to the hydraulic circuit diagram shown in FIG. 1. As shown in FIG. 1, a damping force adjusting type hydraulic shock absorber 1 comprises a cylinder 2 containing hydraulic fluid sealed therein, a piston 3 slidably fitted in the cylinder 2 for dividing the interior of the cylinder into an upper cylinder chamber (as a working chamber) 2a and a lower cylinder chamber (as a working chamber) 2b, and a piston rod 4 including one end connected to the piston 3 and an opposite end extending through the upper cylinder chamber 2a out of the cylinder 2. The cylinder 2 includes a base valve 5 at the bottom thereof. A reservoir 6 is connected to the lower cylinder chamber 2b through the base valve 5. The reservoir 6 (as a working chamber) contains hydraulic fluid and gas sealed therein.

The piston 3 includes an oil passage 7 for communicating between the upper cylinder chamber 2a and the lower cylinder chamber 2b. The piston 3 also includes in the oil passage 7 thereof a check valve 8 for permitting only flow of the hydraulic fluid from the lower cylinder chamber 2b to the upper cylinder chamber 2a and preventing flow thereof from the upper cylinder chamber 2a to the lower cylinder chamber 2b. The base valve 5 includes an oil passage 9 for communicating between the lower cylinder chamber 2b and the reservoir 6. The base valve 5 also includes in the oil passage 9 thereof a check valve 10 for permitting only flow of the hydraulic fluid from the reservoir 6 to the lower cylinder chamber 2b and preventing flow thereof from the lower cylinder chamber 2b to the reservoir 6.

A primary passage 11 is provided outside the cylinder 2 for communicating between the upper cylinder chamber 2a and the reservoir 6. The primary passage 11 includes a pilot type primary damping valve 12. The primary passage 11 also includes a secondary damping valve 13 located upstream of the primary damping valve 12. The primary passage 11 is connected to a secondary passage 14 at a branch point for bypassing the primary damping valve 12 to communicate between the upstream side thereof (or the upper cylinder chamber 2a side) and the downstream side thereof (or the reservoir 6 side). The secondary passage 14 includes, in sequence from the upstream side, a constant (or fixed) orifice 15, a filter 16, and a damping force adjusting valve 17 (as a variable orifice).

The primary damping valve 12 is a pilot type pressure control valve and has a pilot line 18. The pilot line 18 is connected between the filter 16 of the secondary passage 14 and the damping force adjusting valve 17. The primary damping valve 12 is subjected to pressure from the upstream side thereof to open and generate a damping force in response to an opening degree of the primary damping valve 12. A valve opening pressure of the primary damping valve 12 is changed in response to a change in pilot pressure which is introduced from the pilot line 18. Specifically, the valve opening pressure of the pilot type primary damping valve 12 increases as the pilot pressure rises. The damping force adjusting valve 17 is an electromagnetic proportional flow control valve and adjusts the cross sectional flow area of the secondary passage 14 in response to a change in current applied to an electric solenoid included in the damping force adjusting valve 17.

The secondary damping valve 13 comprises a pressure control valve 13a such as a disc valve and the like and an orifice 13b. The valve opening pressure of the pressure control valve 13a is set to be lower than that of the primary damping valve 12. When the piston 3 moves at a low speed, the pressure control valve 13a prevents a damping force from becoming excessively low and the orifice 13b prevents it from becoming excessively high, thereby providing a suitable damping force.

The filter 16 comprises a fine mesh or a porous material such as a sintered metal and the like and can hold back therein foreign matter such as metal powder, contaminants, rust and the like present in the hydraulic fluid passing therethrough.

The following is the function of the first embodiment constructed as mentioned above.

When the piston rod 4 is in the extending stroke, movement of the piston 3 causes the check valve 8 of the piston 3 to be closed so that the hydraulic fluid in the 2 upper cylinder chamber 2a side is pressurized to flow into the reservoir 6 side through the primary passage 11 and the secondary passage 14. The hydraulic fluid then opens the check valve 10 of the base valve 5 to flow therethrough from the reservoir 6 into the lower cylinder chamber 2b by the same amount as the piston rod 4 comes out of the cylinder 2. When the piston rod 4 is in the compressing stroke, movement of the piston 3 causes the check valve 8 provided in the oil passage 7 to be opened so that the hydraulic fluid in the lower cylinder chamber 2b flows directly into the upper cylinder chamber 2a and so that the pressure in the upper cylinder chamber 2a is substantially equal to that in the lower cylinder chamber 2b, thereby causing the check valve 10 of the base valve 5 to be closed. The hydraulic fluid in the cylinder 2 is then pressurized by the same amount as the piston rod 4 comes into the cylinder so that the hydraulic fluid flow from the upper cylinder chamber 2a side into the reservoir 6 side through the primary passage 11 and the secondary passage 14 in the same manner as the extending stroke.

When the piston rod 4 is in the extending or compressing stroke and the piston speed is low, the primary damping valve 12 is closed. Thus, before the primary damping valve 12 is opened, a damping force is generated on the basis of an orifice characteristic (which means that the damping force is approximately proportional to the square of the piston speed) according to the cross sectional flow area of the secondary damping valve 13, the constant orifice 15 of the secondary passage 14, and the damping force adjusting valve 17. Then, in addition to the orifice characteristic by the orifice 13b of the secondary damping valve 13, a damping force is also generated on the basis of a valve characteristic (which means that the damping force is approximately proportional to the piston speed) of the pressure control valve 13a, thereby providing a suitable damping force in the low speed range of the piston. When the piston speed is high to increase the pressure in the upper cylinder chamber 2a side to open the primary damping valve 12, a damping force is generated on the basis of the valve characteristic according to the order of opening of the primary damping valve 12.

Adjusting the cross sectional flow area of the damping force adjusting valve 17 to be decreased increases the pressure loss thereof to raise the pressure in the upstream side of the damping force adjusting valve 17, thereby causing the pilot pressure introduced from the pilot line 18 to be raised to increase the valve opening pressure of the primary damping valve 12. Adjusting the cross sectional flow area of the damping force adjusting valve 17 to be increased decreases the pressure loss thereof to lower the pressure on the upstream side of the damping force adjusting valve 17, thereby causing the pilot pressure introduced from the pilot line 18 to be lowered to decrease the valve opening pressure of the primary damping valve 12. Adjusting the current applied to the electric solenoid of the damping force adjusting valve 17 to change the cross sectional flow area of the damping force adjusting valve 17 can directly control the extending side orifice characteristic and the contracting side orifice characteristic. Adjusting the current also changes the pilot pressure of the primary damping valve 12 to control the extending side valve characteristic and the contracting side valve characteristic.

Through the secondary passage 14, the hydraulic fluid flows in only one direction from the upper cylinder chamber 2a side into the reservoir 6 side during not only the extending stroke but also the compressing stroke. Thus, foreign matter in the hydraulic fluid can be held back by the filters 16. Thus, since the filter 16 filter the hydraulic fluid to be kept clean, the hydraulic shock absorber can be enhanced in durability.

Even if the filter 16 becomes clogged, the primary passage 11 ensures the flow of the hydraulic fluid from the upper cylinder chamber 2a into the reservoir 6, thereby preventing excessive deterioration in vehicle handling caused by an excessive rise in damping force and also preventing damage to the filter 16 caused by an excessive rise in the pressure of the hydraulic fluid. When the filter 16 becomes clogged, the flow resistance thereof is raised to increase the pressure loss and so as to lower the pressure on the downstream side of the filter 16, thereby causing the pilot pressure introduced from the pilot line 18 to be lowered to decrease the valve opening pressure of the primary damping valve 12. This allows the damping force to be maintained suitably low and ensures good vehicle handling.

When the viscosity of the hydraulic fluid is raised at low temperature to increase the flow resistance of the filter 16, as mentioned above, the pressure loss is increased to lower the pressure in the downstream side of the filter 16, thereby causing the pilot pressure to be lowered to decrease the valve opening pressure of the primary damping valve 12. This allows the damping force to be maintained suitably low and prevents any deterioration in vehicle handling at low temperature. The rise in viscosity of the hydraulic fluid also increases the flow resistance of the damping force adjusting valve 17. However, the damping force adjusting valve 17 includes a port and a spool which can adjust the cross sectional opening area of the port, and the cross sectional opening area of the port can be set to be larger in comparison with the filter 16 comprising a porous material. Thus, the damping force adjusting valve 17 is hardly susceptible to the viscosity of the hydraulic fluid, with the result that the pilot pressure can be lowered.

In the above embodiment, the filter 16 is provided at the downstream side of the constant orifice 15 in the secondary passage 14. The filter 16 may be provided at the upstream side of the constant orifice 15 therein. It brings about the same function and technical advantage as at the downstream side thereof.

The specific construction of the damping force adjusting type hydraulic shock absorber 1 according to the first embodiment will be described below in detail with reference to FIG. 2.

Figure 2:
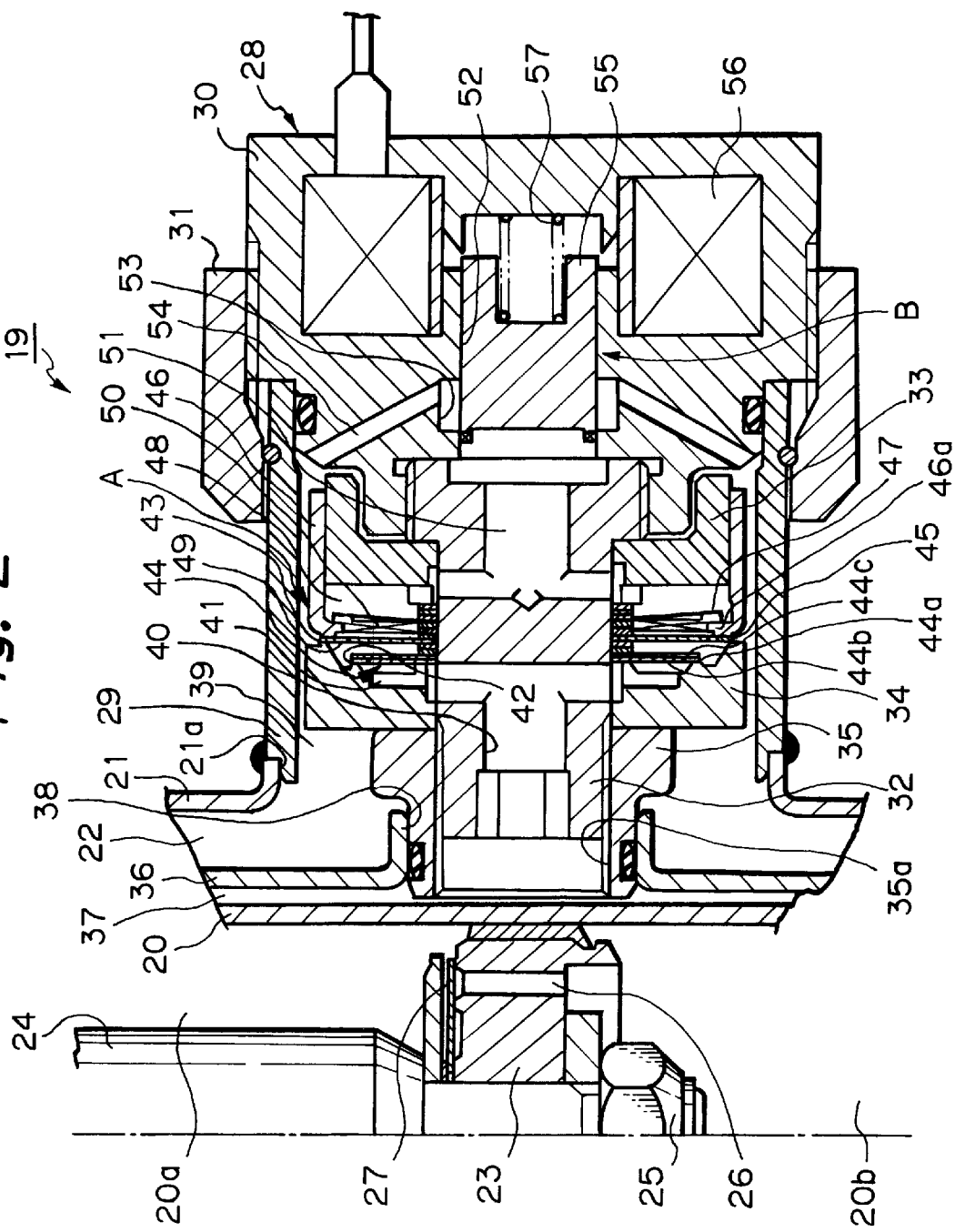
FIG. 2 is a vertical section of a main portion of the first embodiment for specifically illustrating the construction of the first embodiment.

As shown in FIG. 2, a damping force adjusting type hydraulic shock absorber 19 according to the first embodiment comprises a cylinder 20 and an outer cylindrical case 21 provided outside the cylinder 20 to have a double cylindrical construction. A reservoir (as a working chamber) 22 is defined between the cylinder 20 and the case 21. A piston 23 is slidably fitted in the cylinder 20 for dividing the interior of the cylinder 20 into two cylinder chambers, namely an upper cylinder chamber (as a working chamber) 20a and a lower cylinder chamber (as a working chamber) 20b. A piston rod 24 has an inner end and an outer end. The inner end of the piston rod 24 is connected to the piston 23 by a nut 25. The outer end of the piston rod 24 extends out of the cylinder 20 through the upper cylinder chamber 20a and through a rod guide element and a seal element (not shown) which are mounted on the upper end portions of the cylinder 20 and the outer cylindrical case 21. The cylinder 20 includes at the lower end thereof a base valve (not shown) for defining the lower cylinder chamber 20b and the reservoir 22. The cylinder 20 contains hydraulic fluid sealed therein. The reservoir 22 contains hydraulic fluid and gas sealed therein.

The piston 23 includes an oil passage 26 for communicating between the upper cylinder chamber 20a and the lower cylinder chamber 20b. The piston 23 also includes in the oil passage 26 thereof a check valve 27 for permitting only flow of the hydraulic fluid from lower cylinder chamber 20b to the upper cylinder chamber 20a and preventing flow thereof from the upper cylinder chamber 20a to the lower cylinder chamber 20b. The base valve includes an oil passage (not shown) for communicating between the lower cylinder chamber 20b and the reservoir 22. The base valve also includes in the oil passage thereof a check valve (not shown) for permitting only flow of the hydraulic fluid from the reservoir 22 to the lower cylinder chamber 20b and preventing flow thereof from the lower cylinder chamber 20b to the reservoir 22.

The outer cylindrical case 21 has at the side surface portion thereof a damping force generating mechanism 28. The outer cylindrical case 21 has at the side wall thereof an opening 21a. The damping force generating mechanism 28 comprises a cylindrical case 29, a proportional electric solenoid 30, and a retainer 31. The inner side end of the cylindrical case 29 is connected to the opening 21a of the outer cylindrical case 21. The proportional electric solenoid 30 is fitted into the outer side end of the cylindrical case 29 and is fixed thereto by the retainer 31. The damping force generating mechanism 28 also comprises a passage element 32 having an oil passage 40, an annular fixed element 33, a valve element 34, and a union nut 35 having an oil passage 35a. The passage element 32 is inserted into the cylindrical case 29. One end of the passage element 32 is threadably engaged in the proportional electric solenoid 30. The annular fixed element 33 and the valve element 34 are fitted around the circumference of the passage element 32 and are fixedly mounted thereon by the union nut 35 threadably engaged on the other end of the passage element 32.

A tube 36 is provided around the cylinder 20, and an annular oil passage 37 is defined between the cylinder 20 and the tube 36. The cylinder 20 has a hole (not shown) provided in the side wall thereof adjacent to the upper end thereof. The annular oil passage 37 communicates with the upper cylinder chamber 20a through the hole provided In the upper side thereof. The tube 36 has an opening 38 provided in the side wall thereof. The distal end portion of the union nut 35 is fitted into the opening 38 of the tube 36 to thereby communicate between the oil passage 35a and the annular oil passage 37. Defined within the cylindrical case 29 is an oil chamber 39 directly communicating with the reservoir 22.

Provided in the valve element 34 is an oil passage 41 communicating with the upper cylinder chamber 20a through the oil passage 40 of the passage element 32, the oil passage 35a of the union nut 35, and the annular oil passage 37. The valve element 34 has annular valve seats 42 and 43 at the cylindrical inner wall thereof. The valve seat 42 is provided at the inside of the cylindrical inner wall close to the passage element 32. The valve seat 43 is provided at the outside thereof adjacent to the cylindrical case 29. Both of the valve seats 42 and 43 protrude. Seated against the inside valve seat 42 is a secondary valve 44. The secondary valve 44 comprises a cutout valve 44b including an orifice 44a (as a cutout) and a disc valve 44c superimposed on the cutout valve 44b. Seated against the outside valve seat 43 is a disc valve 45.

A generally cylindrical moving element 46 loosely fits over the annular fixed element 33 to slidably move thereover. The inner end portion of the moving element 46 is brought into hermetic contact with the back side of the disc valve 45. The moving element 46 has a flange portion 46a formed in the inner end portion thereof. A leaf spring 47 is arranged between the passage element 32 and the moving element 46. The inner end of the leaf spring 47 is fixedly mounted on the passage element 32. The spring 47 bears against the flange portion 46a to bias the disc valve 45 in its closing direction or toward the valve seat 43. A back pressure chamber 48 (as a pilot line) is defined by the annular fixed element 33, the moving element 46, and the disc valve 45. A pilot type primary damping valve A comprises the annular fixed element 33, the valve seat 43, the disc valve 45, the moving element 46, the leaf spring 47, and the back pressure chamber 48. The disc valve 45 is subjected to the pressure of the hydraulic fluid passing through the secondary valve 44 to thereby be opened so that a damping force is generated according to the order of opening of the disc valve 45. The pressure in the back pressure chamber 48 is applied to the primary damping valve A as a pilot pressure. The rise in the pressure in the back pressure chamber 48 urges the primary damping valve A in its closing direction. In other words, a change in the pressure in the back pressure chamber 48 effects adjustment of the valve opening pressure of the primary damping valve A. The disc valve 45 has a constant (or fixed) orifice 49 for communicating between the oil passage 41 and the back pressure chamber 48 through the orifice 44a and the disc valve 45. The valve opening pressure of the secondary valve 44 is set to be lower than that of the primary damping valve A.

An annular filter 50 is mounted on the inside of the flange portion 46a of the moving element 46. When the hydraulic fluid flows from the constant orifice 49 into the back pressure chamber 48, it passes through the annular filter 50. The annular filter 50 comprises a fine mesh or a porous material such as a sintered metal and the like and can hold back therein foreign matter such as metal powder, contaminants, rust and the like present in the hydraulic fluid passing therethrough.

The passage element 32 has an oil passage 51 provided therein communicating with the back pressure chamber 48. The proportional electric solenoid 30 has a bore 52 provided therein communicating with the oil passage 51 of the passage element 32. The bore 52 has an annular groove 53 formed around the inside thereof. The proportional electric solenoid 30 has an oil passage 54 for communicating between the annular groove 53 and the oil chamber 39. Thus, the annular groove 53 communicates with the oil chamber 39 through the oil passage 54. A spool 55 fits into the bore 52 of the proportional electric solenoid 30 for slidable movement of the spool 55 relative to the proportional electric solenoid 30. A flow control valve (as a damping force adjusting valve or a variable orifice) B comprises the bore 52 and the spool 55. A spring 57 is located In the bore 52 to bias the spool 55 toward the passage element 32. The spool 55 moves against the biasing force of the spring 57 in response to a change in the current applied to an electric solenoid 56 included in the proportional electric solenoid 30 to open and close the annular groove 53, thereby enabling the cross sectional flow area between the oil passages 51 and 54 to be adjusted.

It should be noted that a primary passage for communicating between the upper cylinder chamber 20a and the reservoir comprises the annular oil passage 37, the oil passage 35a, the oil passage 40, the oil passage 41, and the oil chamber 39. It should be also noted that a secondary passage comprises the constant orifice 49, the back pressure chamber 48, the oil passage 51, the bore 52, the annular groove 53, and the oil passage 54.

The following is the function of the first embodiment constructed as mentioned above.

When the piston rod 24 is in the extending stroke, movement of the piston 3 causes the check valve 27 of the piston 23 to be closed so that the hydraulic fluid in the upper cylinder chamber 20a side is pressurized to flow into the oil passage 35a of the damping force generating mechanism 28 through the annular oil passage 37. Subsequently, the hydraulic fluid flows from the oil passage 35a into the reservoir 22 through the oil passage 40, the oil passage 41, the secondary valve 44, the constant orifice 49 of the disc valve 45, the annular filter 50, the back pressure chamber 48, the oil passage 51, the bore 52, the annular groove 53, the oil passage 54, and the oil chamber 39. If the pressure in the upper cylinder chamber 20a side reaches the valve opening pressure of the disc valve 45, the hydraulic fluid passing through the secondary valve 44 then opens the primary damping valve A to directly flow into the oil chamber 39. The hydraulic fluid opens the check valve of the base valve to flow therethrough from the reservoir 22 into the lower cylinder chamber 20b by the same amount as the piston rod 24 comes out of the cylinder 20.

When the piston rod 24 is in the compressing stroke, movement of the piston 23 causes the check valve 27 of the piston 23 to be opened so that the hydraulic fluid in the lower cylinder chamber 20b flows directly into the upper cylinder chamber 20a and that the pressure in the upper cylinder chamber 20a is substantially equal to that in the lower cylinder chamber 20b, thereby causing the check valve of the base valve to be closed. The hydraulic fluid in the cylinder 20 is then pressurized by the same amount as the piston rod 24 comes into the cylinder 20 so that the hydraulic fluid flow from the upper cylinder chamber 20a side into the reservoir 22 side through the same passages as mentioned above in the extending stroke.

When the piston rod 24 is in the extending or compressing stroke and the piston speed is low, the primary damping valve A is closed. Thus, before the primary damping valve A is opened, a damping force is generated on the basis of an orifice characteristic according to the cross sectional flow area of the secondary valve 44, the constant orifice 49, and the flow control valve B. Then, a suitable damping force can be generated in the low speed range of the piston by the valve characteristic of the secondary valve 44. When the piston speed is high to increase the pressure in the upper cylinder chamber 20a side to open the primary damping valve A, a damping force is generated on the basis of the valve characteristic according to the order of opening of the primary damping valve A.

In this case, adjusting the cross sectional flow area of the flow control valve B to be decreased increases the pressure loss thereof to raise the pressure in the upstream side of the flow control valve B, thereby causing the pilot pressure in the back pressure chamber 48 to be raised to increase the valve opening pressure of the primary damping valve A. Adjusting the cross sectional flow area of the flow control valve B to be increased decreases the pressure loss thereof to lower the pressure in the upstream side of the flow control valve B, thereby causing the pilot pressure in the back pressure chamber 48 to be lowered to decrease the valve opening pressure of the primary damping valve A. Thus, adjusting the current applied to the electric solenoid 56 of the proportional electric solenoid 30 to change the cross sectional flow area of the flow control valve B can directly control the extending side orifice characteristic and the contracting side orifice characteristic. Adjusting the current also change the pilot pressure of the primary damping valve A to control the extending side valve characteristic and the contracting side valve characteristic.

During not only the extending stroke but also the compressing stroke of the piston rod 24, the hydraulic fluid flows in only one direction from the constant orifice 49 of the disc valve 45 into the back pressure chamber 48 through the annular filter 50. Thus, foreign matter entered in the hydraulic fluid can be held back by the filter 50. Thus, since the filter 50 filters the hydraulic fluid to be kept clean, the hydraulic shock absorber can be enhanced in durability.

Even if the filter 50 becomes clogged, opening of the primary damping valve A ensures the flow of the hydraulic fluid from the upper cylinder chamber 20a into the reservoir 22, thereby preventing excessive deterioration in vehicle handling caused by an excessive rise in damping force and also preventing damage to the filter 50 caused by an excessive rise in pressure of the hydraulic fluid. When the filter 50 becomes clogged, the flow resistance thereof is raised to increase the pressure loss to lower the pilot pressure in the back pressure chamber 48 in the downstream side of the filter 50, thereby decreasing the valve opening pressure of the primary damping valve A. This allows the damping force to be maintained suitably low and ensures good vehicle handling.

When the viscosity of the hydraulic fluid is raised at low temperature to increase the flow resistance of the filter 50, as mentioned above, the pressure loss is increased to lower the pilot pressure in the back pressure chamber 48, thereby decreasing the valve opening pressure of the primary damping valve A. This allows the damping force to be maintained suitably low and prevents any deterioration in vehicle handling at low temperature. The rise in viscosity of the hydraulic fluid also increases the flow resistance of the flow control valve B. However, the flow control valve B includes a port of the annular groove 53 and a spool 55 which can adjust the cross sectional opening area of the port, and the cross sectional opening area of the port can be set to be larger in comparison with the filter 50 comprising a porous material. Thus, the flow control valve B is hardly susceptible to the viscosity of the hydraulic fluid with the result that the pilot pressure in the back pressure chamber 48 can be lowered.

A damping force adjusting type hydraulic shock absorber according to the second embodiment of the present invention will be described below with reference to the hydraulic circuit diagram shown in FIG. 3. It should be noted that the second embodiment is generally identical to the first embodiment in the hydraulic shock absorber body portion. Thus, in the second embodiment, common elements have been given the same reference numerals, and only different construction will be described below in detail.

A damping force adjusting type hydraulic shock absorber 58 according to the second embodiment includes an extending side primary passage 59 communicating between the upper cylinder chamber 2a and the lower cylinder chamber 2b and a contracting side primary passage 60 communicating between the lower cylinder chamber 2b and the reservoir 6. The extending side primary passage 59 and the contracting side primary passage 60 are located outside the cylinder 2. The extending side primary passage 59 includes an extending side primary damping valve 61 (as an extending side pilot type primary damping valve) and an extending side secondary damping valve 62 provided upstream of the extending side primary damping valve 61. The contracting side primary passage 60 includes a contracting side primary damping valve 63 (as a contracting side pilot type primary damping valve) and a contracting side secondary damping valve 64 provided upstream of the contracting side primary damping valve 63.

Connected to the extending side primary passage 59 at a branch point is an extending side secondary passage 65 for bypassing the extending side primary damping valve 61 to communicate between the upstream and downstream sides of the extending side primary damping valve 61. Connected to the contracting side primary passage 60 at a branch point is a contracting side secondary passage 66 for bypassing the contracting side primary damping valve 63 to communicate between the upstream and downstream sides of the contracting side primary damping valve 63. The extending side secondary passage 65 includes a constant orifice 67 (as an extending side constant orifice). The contracting side secondary passage 66 includes a constant orifice 68 (as a contracting side constant orifice). A damping force adjusting valve 69 (as an extending side variable orifice or a contracting side variable orifice) is located downstream of the constant orifices 67 and 68.

The extending side primary damping valve 61 is a pilot type pressure control valve. The contracting side primary damping valve 63 is also a pilot type pressure control valve. The extending side primary damping valve 61 includes a pilot line 70 having one end connected to valve 61 and an opposite end connected to the extending side secondary passage 65 between the damping force adjusting valve 69 and the downstream side of the constant orifice 67. The contracting side primary damping valve 63 includes a pilot line 71 having one end connected to valve 63 and an opposite end connected to the contracting side secondary passage 66 between the damping force adjusting valve 69 and the downstream side of the constant orifice 68. The extending side primary damping valve 61 is subjected to pressure from the upstream side thereof to open and generate a damping force in response to an opening degree of the extending side primary damping valve 61. A valve opening pressure of the extending side primary damping valve 61 is changed in response to a change in pilot pressure which is introduced from the pilot line 70. Specifically, the valve opening pressure of the extending side primary damping valve 61 increases as the pilot pressure rise. The contracting side primary damping valve 63 is also subjected to pressure from the upstream side thereof to open and generate a damping force in response to an opening degree of the contracting side primary damping valve 63. A valve opening pressure of the contracting side primary damping valve 63 is also changed in response to a change in pilot pressure which is introduced from the pilot line 71. Specifically, the valve opening pressure of the contracting side primary damping valve 63 increases as the pilot pressure rise.

The damping force adjusting valve 69 is an electromagnetic proportional flow control valve and includes a valve body such as a spool (not shown) and an electric solenoid for actuation of the valve body (not shown). The damping force adjusting valve 69 adjusts the cross sectional flow area of the extending side and contracting side secondary passages 65 and 66 by movement of the valve body in response to a change in current applied to the electric solenoid.

The extending side secondary damping valve 62 comprises a pressure control valve 62a such as a disc valve and the like and an orifice 62b. The contracting side secondary damping valve 64 comprises a pressure control valve 64a such as a disc valve and the like and an orifice 64b. The valve opening pressure of the pressure control valve 62a is set to be lower than that of the extending side primary damping valve 61. The valve opening pressure of the pressure control valve 64a is set to be lower than that of the contracting side primary damping valve 63. When the piston 3 moves at a low speed, the pressure control valves 62a and 64a prevent a damping force from being excessively decreased and the orifices 62b and 64b prevent it from being excessively increased, thereby providing a suitable damping force.

The extending side secondary passage 65 includes a filter 72 constructed in the same manner as the filter 16 according to the first embodiment. The filter 72 is located between the constant orifice 67 and the portion of the extending side secondary passage 65 to which the pilot line 70 is connected. The contracting side secondary passage 66 includes a filter 73 constructed in the same manner as the filter 16 according to the first embodiment. The filter 73 is located between the constant orifice 68 and the portion of the contracting side secondary passage 66 to which the pilot line 71 is connected.

The following is the function of the second embodiment constructed as mentioned above.

When the piston rod 4 is in the extending stroke, movement of the piston 3 causes the check valve 8 of the piston 3 to be closed so that the hydraulic fluid in the upper cylinder chamber 2a side is pressurized. In this case, when the extending side primary damping valve 61 is closed, the pressurized hydraulic fluid flows from the upper cylinder chamber 2a into the lower cylinder chamber 2b through the extending side primary passage 59 (between the upper cylinder chamber 2a and the extending side secondary damping valve 62), the extending side secondary damping valve 62, the constant orifice 67, the filter 72, the extending side secondary passage 65 (between the filter 72 and the damping force adjusting valve 69), the damping force adjusting valve 69, the extending side secondary passage 65 (provided downstream of the damping force adjusting valve 69), and the extending side primary passage 59 (located in the lower cylinder chamber side). On the other hand, during the extending stroke, when the pressure in the upper cylinder chamber 2a reaches the valve opening pressure of the extending side primary damping valve 61, the primary damping valve 61 is opened to allow the hydraulic fluid to flow from the upper cylinder chamber 2a directly into the lower cylinder chamber 2b through the extending side primary passage 59 (between the upper cylinder chamber 2a and the extending side secondary damping valve 62), the extending side secondary damping valve 62, the extending side primary damping valve 61, and the extending side primary passage 59 (located in the lower cylinder chamber side). The hydraulic fluid then opens the check valve 10 of the base valve 5 to flow therethrough from the reservoir 6 into the lower cylinder chamber 2b by the same amount as the piston rod 4 comes out of the cylinder 2.

When the piston speed is low, the extending side primary damping valve 61 is closed. Thus, before the extending side primary damping valve 61 is opened, a damping force is generated on the basis of the orifice characteristic according to a change in the cross sectional flow area of the extending side secondary passage 65 caused by the damping force adjusting valve 69. Then, by the extending side secondary damping valve 62, a damping force is also generated on the basis of the valve characteristic of the pressure control valve 62a and the orifice characteristic of the orifice 62b, thereby providing a suitable damping force in the low speed range of the piston. When the piston speed is high to increase the pressure in the upper cylinder chamber 2a side to open the extending side primary damping valve 61, a damping force is generated on the basis of the valve characteristic of the extending side primary damping valve 61 according to the order of opening thereof.

Adjusting the current applied to the electric solenoid of the damping force adjusting valve 69 to change the cross sectional flow area of the extending side secondary passage 65 can directly control the orifice characteristic. Adjusting the current also changes the pilot pressure introduced from the pilot line 70 to control the valve opening pressure of the extending side primary damping valve 61 to adjust the valve characteristic.

When the piston rod 4 is in the compressing stroke, movement of the piston 3 causes the check valve 8 of the piston 3 to be opened so that the pressure in the upper cylinder chamber 2a is substantially identical to that in the lower cylinder chamber 2b, thereby causing the check valve 10 of the base valve 5 to be closed. The hydraulic fluid in the cylinder 2 is then pressurized by the same amount as the piston rod 4 comes into the cylinder 2 so that the hydraulic fluid flows from the lower cylinder chamber 2b into the reservoir 6 through the contracting side primary passage 60, the contracting side secondary damping valve 64, the filter 73, the contracting side secondary passage 66 (between the filter 73 and the damping force adjusting valve 69), the damping force adjusting valve 69, and the contracting side secondary passage 66 (between the damping force adjusting valve 69 and the reservoir 6). On the other hand, during the compressing stroke, when the pressure in the cylinder 2 reaches the valve opening pressure of the contracting side primary damping valve 63, the primary damping valve 63 is opened to allow the hydraulic fluid to flow from the lower cylinder chamber 2b directly into the reservoir 6 through the contracting side primary passage 60, the contracting side secondary damping valve 64, and the contracting side primary damping valve 63. It should be noted that the pressure in the upper cylinder chamber 2a is substantially identical to that in the lower cylinder chamber 2b as mentioned above, thereby not causing the flow of the hydraulic fluid between the upper cylinder chamber 2a and the lower cylinder chamber 2b.

When the piston speed is low, the contracting side primary damping valve 63 is closed. Thus, before the contracting side primary damping valve 63 is opened, a damping force is generated on the basis of the orifice characteristic according to a change in the cross sectional flow area of the contracting side secondary passage 66 caused by the damping force adjusting valve 69. Then, by the contracting side secondary damping valve 64, a damping force is generated on the basis of the valve characteristic of the pressure control valve 64a and the orifice characteristic of the orifice 64b, thereby providing a suitable damping force in the low speed range of the piston. When the piston speed is high to increase the pressure in the cylinder 2 to open the contracting side primary damping valve 63, a damping force is generated on the basis of the valve characteristic of the contracting side primary damping valve 63 according to the order of opening thereof.

Adjusting the current applied to the electric solenoid of the damping force adjusting valve 69 to change the cross sectional flow area of the contracting side secondary passage 66 can directly control the orifice characteristic. Adjusting the current also changes the pilot pressure introduced from the pilot line 71 to control the valve opening pressure of the contracting side primary damping valve 63 to adjust the valve characteristic.

The damping force adjusting valve 69 can be controlled so that when the cross sectional flow area of one of the extending side secondary passage 65 and the contracting side secondary passage 66 is adjusted to be decreased, the other is adjusted to be increased, and that when the cross sectional flow area of one of the extending side secondary passage 65 and the contracting side secondary passage 66 is adjusted to be increased, the other is adjusted to be decreased, thereby making a damping force in the extending stroke different from that in the compressing stroke to provide any kind of a damping force characteristic. For example a damping force in the extending stroke may be set to be hard and a damping force in the compressing stroke may be set to be soft, and vice versa.

By the piston rod 4 coming out of the cylinder, the hydraulic fluid flows in only one direction from the constant orifice 67 to the damping force adjusting valve 69 through the extending side secondary passage 65. By the piston rod 4 coming into the cylinder, the hydraulic fluid flows in only one direction from the constant orifice 68 to the damping force adjusting valve 69 through the contracting side secondary passage 66. Thus, during not only the extending stroke but also the compressing stroke, foreign matter in the hydraulic fluid can be held back by the filters 72 and 73, respectively. Since the filters 72 and 73 filter the hydraulic fluid to be kept clean, the hydraulic shock absorber can be enhanced in durability.

Even if the filter 72 becomes clogged, the extending side primary damping valve 61 is opened to ensure the flow of the hydraulic fluid between the upper cylinder chamber 2a and the lower cylinder chamber 2b. In addition to that, even if the filter 73 becomes clogged, the contracting side primary damping valve 63 is opened to ensure the flow of the hydraulic fluid between the lower cylinder chamber 2b and the reservoir 6. Thus, this prevents excessive deterioration in vehicle handling caused by an excessive rise in damping force and also prevents damage to the filters 72 and 73 caused by an excessive rise in pressure of the hydraulic fluid. When the filters 72 and 73 become clogged, the flow resistance thereof is raised to increase the pressure loss to lower the pressure in the downstream side each of the filters 72 and 73, thereby causing the pilot pressure introduced from the pilot lines 70 and 71 to be lowered to decrease the valve opening pressure of the extending side and contracting side primary damping valves 61 and 63. This allows the damping force in the extending and contracting sides to be maintained suitably low and ensures good vehicle handling.

When the viscosity of the hydraulic fluid is raised at low temperature to increase the flow resistance of the filters 72 and 73, as mentioned above, the pressure loss is increased to lower the pressure in the downstream sides of the filters 72 and 73, thereby causing the pilot pressure to be lowered to decrease the valve opening pressure of the primary damping valves 61 and 63. This allows the damping force to be maintained suitably low and prevents any deterioration in vehicle handling at low temperature. The rise in viscosity of the hydraulic fluid also increases the flow resistance of the damping force adjusting valve 69. However, the damping force adjusting valve 69 includes a port and a spool which can adjust the cross sectional opening area of the port, and the cross sectional opening area of the port can be set to be larger in comparison with the filters 72 and 73 comprising a porous material. Thus, the damping force adjusting valve 69 is hardly susceptible to the viscosity of the hydraulic fluid, with the result that the pilot pressure can be lowered.

In the above second embodiment, the filters 72 and 73 are provided at the downstream sides of the constant orifices 67 and 68 in the secondary passages 65 and 66, respectively. The filters 72 and 73 may be provided at the upstream sides of the constant orifices 67 and 68, respectively. It brings about the same function and technical advantage as at the downstream side thereof.

The specific construction of a damping force generating mechanism 74 of the damping force adjusting type hydraulic shock absorber 58 according to the second embodiment will be described below in detail with reference to FIG. 4.

Figure 4:
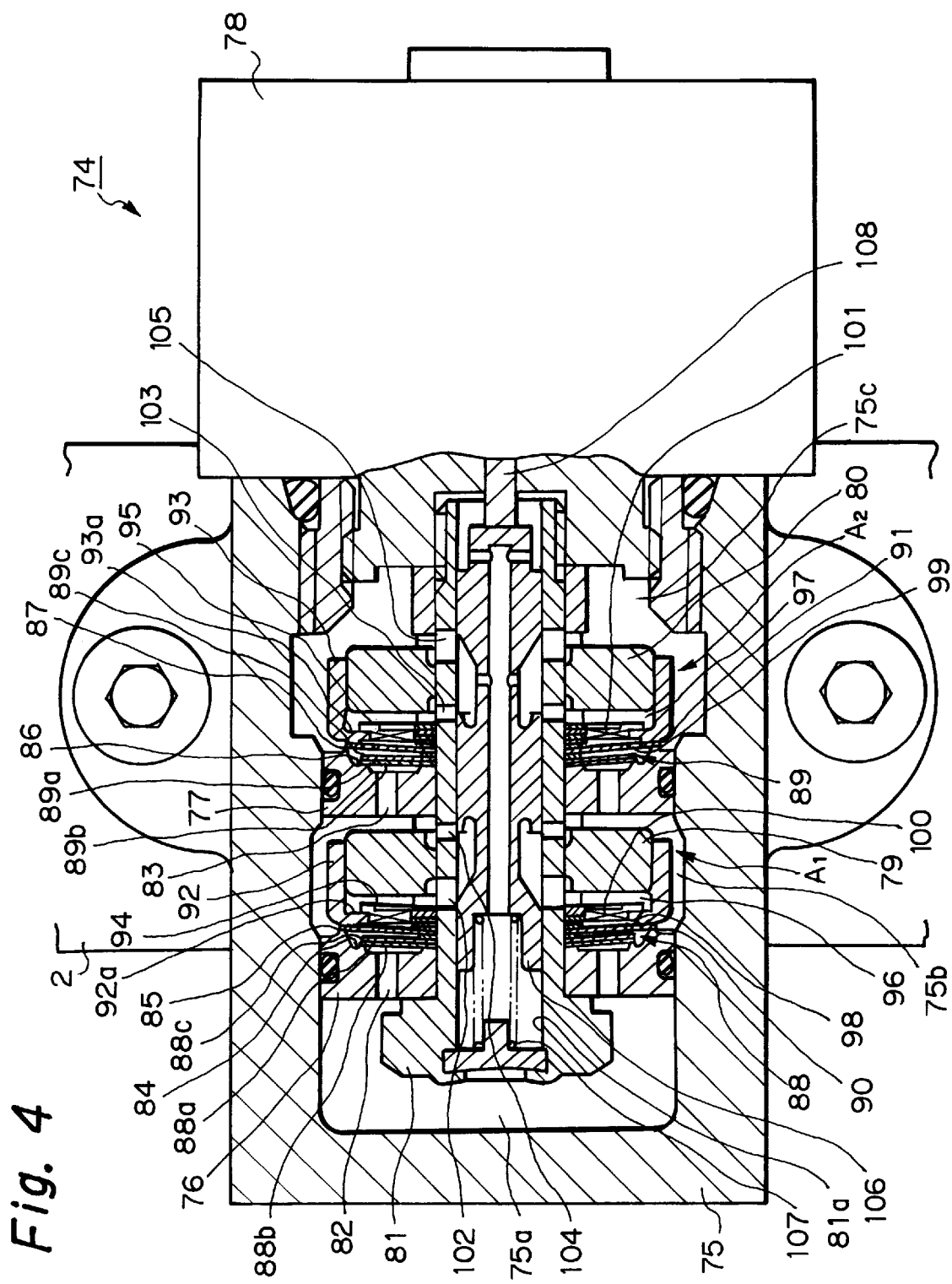
FIG. 4 is a vertical section of a main portion of the second embodiment for specifically illustrating the construction of the second embodiment.

As shown in FIG. 4, the damping force generating mechanism 74 comprises a cylindrical case 75 having a bottom, two annular valve elements 76 and 77 fitted into the bore of the cylindrical case 75, and a proportional solenoid actuator 78 threadably engaged in the opening of the cylindrical case 75. The interior of the cylindrical case 75 is divided into three oil chambers 75a, 75b, and 75c by the annular valve elements 76 and 77. An annular fixed element 79 is disposed in the oil chamber 75b. An annular fixed element 80 is disposed in the oil chamber 75c. A generally cylindrical guide element 81 extends through the central opening each of the annular valve elements 76 and 77 and the annular fixed elements 79 and 80, and the end portion of the guide element 81 is threadably engaged in the actuator 78. Thus, the guide element 81, the valve elements 76 and 77, the fixed elements 79 and 80, and the actuator 78 are fixedly disposed within the cylindrical case 75. The cylindrical case 75 is mounted on the side of the cylinder 2. The oil chambers 75a, 75b, and 75c communicate with the upper cylinder chamber 2a, the lower cylinder chamber 2b, and the reservoir 6, respectively.

The annular valve element 76 has an oil passage 82 for communicating between the oil chambers 75a and 75b. The annular valve element 77 has an oil passage 83 for communicating between the oil chambers 75b and 75c. The valve element 76 has two annular inside and outside valve seats 84 and 85 provided around the opening of the oil passage 82. Both of the valve seats 84 and 85 protrude. The valve element 77 also has two annular inside and outside valve seats 86 and 87 provided around the opening of the oil passage 83. Both of the valve seats 86 and 87 also protrude. Seated against the inside valve seat 84 is an extending side secondary valve 88. Seated against the inside valve seat 86 is a contracting side secondary valve 89. The extending side secondary valve 88 comprises a cutout valve 88b including an orifice 88a (as a cutout) and a disc valve 88c superimposed on the cutout valve 88b. The contracting side secondary valve 89 comprises a cutout valve 89b including an orifice 89a (as a cutout) and a disc valve 89c superimposed on the cutout valve 89b. Seated against the outside valve seat 85 is a disc valve 90. Also seated against the outside valve seat 87 is a disc valve 91.

A generally cylindrical moving element 92 fits over the annular fixed element 79 to slidably move thereover. A generally cylindrical moving element 93 fits over the annular fixed element 80 to slidably move thereover. One end portion of the moving element 92 is brought into hermetic contact with the back side of the disc valve 90. One end portion of the moving element 93 is brought into hermetic contact with the back side of the disc valve 91. The moving element 92 has a flange portion 92*a* formed in the inside of the end portion thereof. A leaf spring 94 is arranged between the guide element 81 and the moving element 92. The inner end of the leaf spring 94 is fixedly mounted on the guide element 81. The spring 94 bears against the flange portion 92*a* to bias the disc valve 90 in its closing direction or toward the valve seat 85. The moving element 93 has a flange portion 93*a* formed in the inside of the end portion thereof. A leaf spring 95 is arranged between the guide element 81 and the moving element 93. The inner end of the leaf spring 95 is fixedly mounted on the guide element 81. The spring 95 bears against the flange portion 93*a* to bias the disc valve 91 in its closing direction or toward the valve seat 87. A back pressure chamber 96 (as a pilot line) is defined by the annular fixed element 79, the moving element 92, and the disc valve 90. A back pressure chamber 97 (as a pilot line) is defined by the annular fixed element 80, the moving element 93, and the disc valve 91.

An extending side pilot type primary damping valve $A_1$ comprises the annular fixed element 79, the valve seat 85, the disc valve 90, the moving element 92, the leaf spring 94, and the back pressure chamber 96. The disc valve 90 is subjected to the pressure of the hydraulic fluid passing through the secondary valve 88 to thereby be opened so that a damping force is generated according to the order of opening of the disc valve 90. The pressure in the back pressure chamber 96 is applied to the extending side primary damping valve $A_1$ as a pilot pressure. The rise in the pressure in the back pressure chamber 96 urges the extending side primary damping valve $A_1$ in its closing direction. In other words, a change in the pressure in the back pressure chamber 96 effects adjustment of the valve opening pressure of the extending side primary damping valve $A_1$. A contracting side pilot type primary damping valve $A_2$ comprises the annular fixed element 80, the valve seat 87, the disc valve 91, the moving element 93, the leaf spring 95, and the back pressure chamber 97. The disc valve 91 is subjected to the pressure of the hydraulic fluid passing through the secondary valve 89 thereby to be opened so that a damping force is generated according to the order of opening of the disc valve 91. The pressure in the back pressure chamber 97 is applied to the contracting side primary damping valve $A_2$ as a pilot pressure. The rise in the pressure in the back pressure chamber 97 urges the contracting side primary damping valve $A_2$ in its closing direction. In other words, a change in the pressure in the back pressure chamber 97 effects adjustment of the valve opening pressure of the contracting side primary damping valve $A_2$. The valve opening pressure of the extending side secondary valve 88 is set to be lower than that of the extending side primary damping valve $A_1$. The valve opening pressure of the contracting side secondary valve 89 is set to be lower than that of the contracting side primary damping valve $A_2$.

The disc valve 90 has a constant orifice 98 (as an extending side constant orifice) formed therein. The disc valve 91 has a constant orifice 99 (as a contracting side constant orifice) formed therein. Annular filters 100 and 101 are mounted on the insides of the flange portions 92*a* and 93*a* of the moving elements 92 and 93, respectively. When the hydraulic fluid flows from the constant orifice 98 into the back pressure chamber 96, it passes through the annular filter 100. When the hydraulic fluid flows from the constant orifice 99 into the back pressure chamber 97, it passes through the annular filter 101. The annular filters 100 and 101 each comprises a fine mesh or a porous material such as a sintered metal and the like and can hold back therein foreign matter such as metal powder, contaminants, rust and the like present in the hydraulic fluid passing therethrough.

The guide element 81 has at the side wall thereof ports 102 and 103 respectively communicating with the back pressure chambers 96 and 97 and ports 104 and 105 respectively communicating with the oil chambers 75*b* and 75*c*. The guide element 81 has a bore 81*a* to slidably receive a spool 106 for adjusting the cross sectional flow area between the ports 102 and 104 and the cross sectional flow area between the ports 103 and the 105. A damping force adjusting valve (as an extending side variable orifice or a contracting side variable orifice) comprises the guide element 81 and the spool 106. A spring 107 is located in the bore 81*a* of the guide element 81 to bias the spool 106 toward the actuator 78. The actuator 78 include an actuating rod 108 for moving the spool 106 against the biasing force of the spring 107 to adjust the orifice area of the ports 104 and 103, thereby enabling the cross sectional flow area between the ports 102 and 104 and the cross sectional flow area between the ports 103 and the 105 to be adjusted.

It should be noted that an extending side primary passage for communicating between the upper cylinder chamber 2*a* and the lower cylinder chamber 2*b* comprises the oil chamber 75*a*, the oil passage 82, and the oil chamber 75*b*, and that a contracting side primary passage for communicating between the lower cylinder chamber 2*b* and the reservoir 6 comprises the oil chamber 75*b*, the oil passage 83, and the oil chamber 75*c*. It should be also noted that an extending side secondary passage comprises the constant orifice 98, the back pressure chamber 96, and the ports 102 and 104, and that a contracting side secondary passage comprises the constant orifice 99, the back pressure chamber 97, and the ports 103 and 105.

The following is the function of the embodiment constructed as mentioned above.

Figure 3:
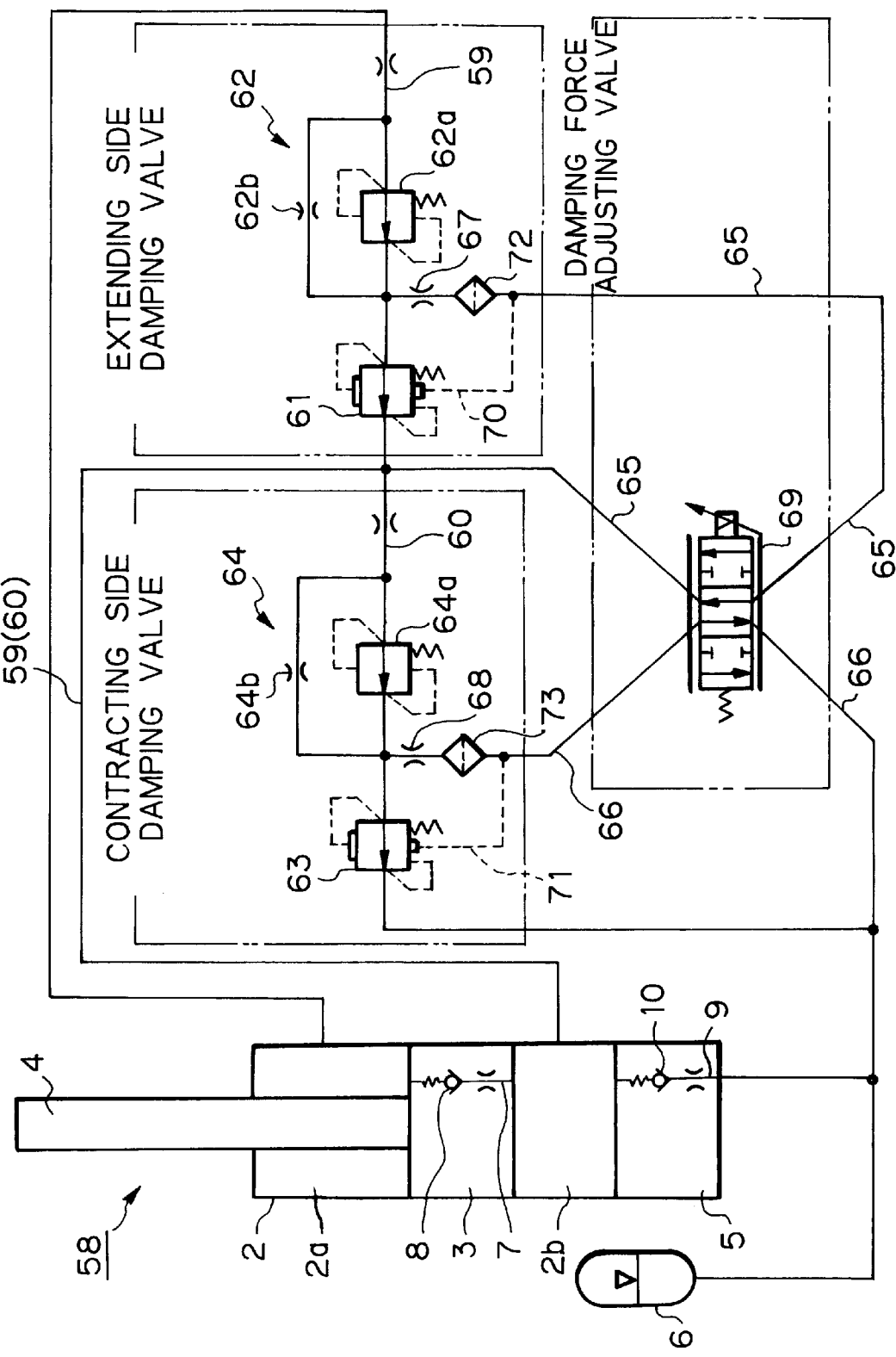
FIG. 3 is a hydraulic circuit diagram according to a second embodiment of the present invention.

When the piston rod 4 is in the extending stroke, as mentioned with reference to FIG. 3, movement of the piston causes the check valve of the piston to be closed so that the hydraulic fluid in the upper cylinder chamber 2*a* side is pressurized to flow from the upper cylinder chamber 2*a* into the lower cylinder chamber 2*b* through the oil chamber 75*a*, the oil passage 82, the extending side secondary valve 88, the constant orifice 98, the annular filter 100, the back pressure chamber 96, the ports 102 and 104, and the oil chamber 75*b* in the damping force generating mechanism 74. When the pressure in the upper cylinder chamber 2*a* side reaches the valve opening pressure of the extending side primary damping valve $A_1$, the extending side primary damping valve $A_1$ is opened to allow the hydraulic fluid to flow from the oil chamber 75*a* directly into the oil chamber 75*b* through the oil passage 82.

When the piston speed is low, the extending side primary damping valve $A_1$ is closed. Thus, before the extending side primary damping valve $A_1$ is opened, a damping force is generated on the basis of the orifice characteristic according to a change in the cross sectional flow area of the port 104 caused by movement of the spool 106. Then, by the extending side secondary valve 88, a damping force is also generated on the basis of the valve characteristic thereof, thereby providing a suitable damping force in the low speed range of the piston. When the piston speed is high to increase the pressure in the upper cylinder chamber 2*a* side to open the extending side primary damping valve $A_1$, a damping force is generated on the basis of the valve characteristic according to the order of opening of the extending side primary damping valve $A_1$.

Movement of the spool 106 by the actuator 78 changes the cross sectional flow area of the port 104 to adjust a damping force. In this case, adjusting the cross sectional flow area of the port 104 to be decreased increases the pressure loss thereof to raise the pressure on the upstream side of the port 104, thereby causing the pilot pressure in the back pressure chamber 96 to be increased to raise the valve opening pressure of the extending side primary damping valve $A_1$. Adjusting the cross sectional flow area of the port 104 to be increased decreases the pressure loss thereof to lower the pressure in the upstream side of the port 104, thereby causing the pilot pressure in the back pressure chamber 96 to be decreased to lower the valve opening pressure of the extending side primary damping valve $A_1$. Thus, movement of the spool 106 by the actuator 78 changes the cross sectional flow area of the port 104 to directly adjust the extending side orifice characteristic and to change the pilot pressure of the extending side primary damping valve $A_1$ to adjust the extending side valve characteristic.

When the piston rod 4 is in the compressing stroke, as mentioned with reference to FIG. 3, the hydraulic fluid flows from the lower cylinder chamber 2b into the reservoir 6 through the oil chamber 75b, the oil passage 83, the contracting side secondary valve 89, the constant orifice 99, the annular filter 101, the back pressure chamber 97, the ports 103 and 105, and the oil chamber 75c in the damping force generating mechanism 74. When the pressure in the lower cylinder chamber 2b side reaches the valve opening pressure of the contracting side primary damping valve $A_2$, the contracting side primary damping valve $A_2$ is opened to allow the hydraulic fluid to flow from the oil chamber 75b directly into the oil chamber 75c through the oil passage 83.

When the piston speed is low, the contracting side primary damping valve $A_2$ is closed. Thus, before the contracting side primary damping valve $A_2$ is opened, a damping force is generated on the basis of the orifice characteristic according to a change in the cross sectional flow area of the port 103 caused by movement of the spool 106. Then, by the contracting side secondary valve 89, a damping force is also generated on the basis of the valve characteristic thereof, thereby providing a suitable damping force in the low speed range of the piston. When the piston speed is high to increase the pressure on the lower cylinder chamber 2b side to open the contracting side primary damping valve $A_2$, a damping force is generated on the basis of the valve characteristic according to the order of opening of the contracting side primary damping valve $A_2$.

Movement of the spool 106 by the actuator 78 changes the cross sectional flow area of the port 103 to adjust the damping force. In this case, adjusting the cross sectional flow area of the port 103 to be decreased increases the pressure loss thereof to raise the pressure in the upstream side of the port 103, thereby causing the pilot pressure in the back pressure chamber 97 to be increased to raise the valve opening pressure of the contracting side primary damping valve $A_2$. Adjusting the cross sectional flow area of the port 103 to be increased decreases the pressure loss thereof to lower the pressure in the upstream side of the port 103, thereby causing the pilot pressure in the back pressure chamber 97 to be decreased to lower the valve opening pressure of the contracting side primary damping valve $A_2$. Thus, movement of the spool 106 by the actuator 78 changes the cross sectional flow area of the port 103 to directly adjust the contracting side orifice characteristic and to change the pilot pressure of the contracting side primary damping valve $A_2$ to adjust the contracting side valve characteristic.

Movement of the spool 106 by the actuator 78 can adjust an extending side damping force and a contracting side damping force at the same time. In this case, for example, according to a position of the spool 106, when the cross sectional flow area of one of the extending side port 104 and the contracting side port 103 is adjusted to be decreased, the other is adjusted to be increased, and when the cross sectional flow area of one of the extending side port 104 and the contracting side port 103 is adjusted to be increased, the other is adjusted to be decreased, thereby making a damping force in the extending stroke different from that in the compressing stroke to provide any kind of a damping force characteristic. For example a damping force in the extending stroke may be set to be hard and a damping force in the compressing stroke may be set to be soft, and vice versa.

By the piston rod 4 coming out of the cylinder, the hydraulic fluid flows in only one direction from the constant orifice 98 of the disc valve 90 to the back pressure chamber 96 through the annular filter 100. By the piston rod 4 coming into the cylinder, the hydraulic fluid flows in only one direction from the constant orifice constant orifice 99 of the disc valve 91 to the back pressure chamber 97 through the annular filter 101. Thus, during not only the extending stroke but also the compressing stroke, foreign matter in the hydraulic fluid can be held back by the filters 100 and 101, respectively. Since the filters 100 and 101 filter the hydraulic fluid to be kept clean, the hydraulic shock absorber can be enhanced in durability thereof.

Even if the filter 100 becomes clogged, the extending side primary damping valve $A_1$ is opened to ensure the flow of the hydraulic fluid between the upper cylinder chamber 2a and the lower cylinder chamber 2b. In addition to that, even if the filter 101 becomes clogged, the contracting side primary damping valve $A_2$ is opened to ensure the flow of the hydraulic fluid between the lower cylinder chamber 2b and the reservoir 6. Thus, this prevents excessive deterioration in vehicle handling caused by an excessive rise in damping force and also prevents damage to the filters 100 and 101 caused by an excessive rise in pressure of the hydraulic fluid. When the filters 100 and 101 become clogged, the flow resistance thereof is raised to increase the pressure loss to lower the pilot pressure in the back pressure chambers 96 and 97 on the downstream side of the filters 100 and 101, respectively, thereby decreasing the valve opening pressure of the extending side primary damping valve $A_1$ and the contracting side primary damping valve $A_2$. This allows the damping force in the extending and contracting sides to be maintained suitably low and ensures good vehicle handling.

When the viscosity of the hydraulic fluid is raised at low temperature to increase the flow resistance of the filters 100 and 101, as mentioned above, the pressure loss is increased to lower the pilot pressure in the back pressure chambers 96 and 97, thereby decreasing the valve opening pressure of the extending side primary damping valve $A_1$ and the contracting side primary damping valve $A_2$. This allows the damping force to be maintained suitably low and prevents any deterioration in vehicle handling at low temperature. The rise in viscosity of the hydraulic fluid also increases the flow resistance of the ports 104 and 103. However, since the cross sectional flow area of the ports 104 and 103 is adjusted by the spool 106, it can be set to be larger in comparison with the filters 100 and 101 comprising a porous material. Thus, the extending side primary damping valve $A_1$ and the contracting side primary damping valve $A_2$ are hardly susceptible to the viscosity of the hydraulic fluid with the result that the pilot pressure can be lowered.

According to the damping force adjusting type hydraulic shock absorbers of the present invention, the filter located in the secondary passage can hold back foreign matter entered in the hydraulic fluid to be kept clean, thereby enhancing durability of the hydraulic shock absorber. Even if the filter becomes clogged, the primary passage ensures the flow of the hydraulic fluid between the working chambers. Thus, this prevents excessive deterioration in vehicle handling caused by an excessive rise in damping force and also prevents damage to the filter caused by an excessive rise in pressure of the hydraulic fluid.

In addition to that, when the filter becomes clogged, the flow resistance thereof is raised to lower the pilot pressure to decrease the flow resistance of pilot type primary damping valve. This allows the damping force to be maintained suitably low and ensures good vehicle handling. When the viscosity of the hydraulic fluid is raised at low temperature to increase the flow resistance of the filter, as mentioned above, the pressure loss is increased to lower the pilot pressure to decrease the flow resistance of pilot type primary damping valve, thereby allowing the damping force to be maintained suitably low and prevents any deterioration in vehicle handling at low temperature.

The entire disclosure of Japanese Patent Application No. Hei 8-90148 filed on Mar. 19, 1996 including specification, claims, drawings and summary is incorporated herein by reference in its entirety.

Various of the features are set forth in the following claims.

What is claimed is:

1. A damping force adjusting type hydraulic shock absorber comprising:
   a cylinder including a plurality of working chambers containing hydraulic fluid sealed therein;
   a piston slidably fitted in said cylinder;
   a piston rod including one end connected to said piston and an opposite end extending out of said cylinder;
   a primary passage which communicates between said working chambers;
   said primary passage including a branch point and a primary damping valve provided downstream of said branch point;
   a secondary passage which extends from said branch point and bypasses said primary damping valve to communicate between said working chambers so that the hydraulic fluid flows therebetween in one direction by sliding movement of said piston; and
   said secondary passage including a filter provided downstream of said branch point and a damping force adjusting valve provided downstream of said filter.

2. A damping force adjusting type hydraulic shock absorber according to claim 1, wherein said secondary passage includes an extending side secondary passage for allowing the hydraulic fluid to flow in one direction when said piston rod is in an extending stroke and a contracting side secondary passage for allowing said hydraulic fluid to flow in one direction when said piston rod is in a compressing stroke, wherein said filter includes two filters, and wherein said damping force adjusting valve and said two filters are provided in said extending side secondary passage and said contracting side secondary passage.

3. A damping force adjusting type hydraulic shock absorber according to claim 1, wherein one of said working chambers comprises a reservoir containing hydraulic fluid and gas sealed therein, wherein said piston divides the interior of said cylinder into an upper cylinder chamber and a lower cylinder chamber, and wherein one of said working chambers comprises said upper cylinder chamber.

4. A damping force adjusting type hydraulic shock absorber according to claim 3, wherein said piston includes an oil passage for communicating between said upper cylinder chamber and said lower cylinder chamber and a check valve for permitting only flow of the hydraulic fluid from said lower cylinder chamber to said upper cylinder chamber and preventing flow thereof from said upper cylinder chamber to said lower cylinder chamber, and wherein said lower cylinder chamber includes, at a bottom portion thereof, a base valve, said base valve having an oil passage for communicating between said lower cylinder chamber and said reservoir and a check valve for permitting only flow of the hydraulic fluid from said reservoir to said lower cylinder chamber and preventing flow thereof from said lower cylinder chamber to said reservoir.

5. A damping force adjusting type hydraulic shock absorber according to claim 4, further comprising a secondary damping valve provided in said primary passage upstream of said primary damping valve.

6. A damping force adjusting type hydraulic shock absorber according to claim 5, wherein said secondary passage has one end communicating with said primary passage between said secondary damping valve and said primary damping valve and an opposite end communicating with said primary passage between said primary damping valve and said reservoir to bypass said primary damping valve to communicate between said upper cylinder chamber and said reservoir.

7. A damping force adjusting type hydraulic shock absorber according to claim 6, further comprising a constant orifice provided in said secondary passage upstream of said damping force adjusting valve.

8. A damping force adjusting type hydraulic shock absorber according to claim 7, wherein said primary damping valve comprises a pressure control valve including a pilot line having one end communicating with said secondary passage between said filter and said damping force adjusting valve.

9. A damping force adjusting type hydraulic shock absorber according to claim 8, wherein said damping force adjusting valve comprises an electromagnetic proportional flow control valve.

10. A damping force adjusting type hydraulic shock absorber comprising:
   a cylinder having a plurality of working chambers containing hydraulic fluid sealed therein;
   a piston slidably fitted in said cylinder;
   a piston rod including one end connected to said piston and an opposite end extending out of said cylinder;
   a primary passage for communicating between said working chambers so that the hydraulic fluid flows therebetween in one direction by sliding movement of said piston;
   a primary damping valve for controlling the flow of the hydraulic fluid in said primary passage to generate a damping force and for adjusting the damping force in response to a change in pilot pressure;
   a secondary passage connected to said primary passage to bypass said primary damping valve;
   a constant orifice provided upstream of said secondary passage;
   a variable orifice provided downstream of said secondary passage;
   said primary damping valve including a pilot line connected to said secondary passage between said constant orifice and said variable orifice; and a filter provided upstream of the portion of said secondary passage to which said pilot line is connected.

11. A damping force adjusting type hydraulic shock absorber according to claim 10, wherein one of said working chambers comprises a reservoir containing hydraulic fluid and gas sealed therein, wherein said piston divides the interior of said cylinder into an upper cylinder chamber and a lower cylinder chamber, and wherein one of said working chambers comprises said upper cylinder chamber.

12. A damping force adjusting type hydraulic shock absorber according to claim 11, wherein said piston includes an oil passage for communicating between said upper cylinder chamber and said lower cylinder chamber and a check valve for permitting only flow of the hydraulic fluid from said lower cylinder chamber to said upper cylinder chamber and preventing flow thereof from said upper cylinder chamber to said lower cylinder chamber, and wherein said lower cylinder chamber includes at the bottom portion thereof a base valve, said base valve having an oil passage for communicating between said lower cylinder chamber and said reservoir and a check valve for permitting only flow of the hydraulic fluid from said reservoir to said lower cylinder chamber and preventing flow thereof from said lower cylinder chamber to said reservoir.

13. A damping force adjusting type hydraulic shock absorber according to claim 12, further comprising a secondary damping valve provided in said primary passage upstream of said primary damping valve.

14. A damping force adjusting type hydraulic shock absorber according to claim 13, wherein said secondary passage has one end communicating with said primary passage between said secondary damping valve and said primary damping valve and an opposite end communicating with said primary passage between said primary damping valve and said reservoir to bypass said primary damping valve to communicate between said upper cylinder chamber and said reservoir.

15. A damping force adjusting type hydraulic shock absorber according to claim 10, wherein said filter is provided downstream of said constant orifice.

16. A damping force adjusting type hydraulic shock absorber according to claim 14, wherein said variable orifice comprises an electromagnetic proportional flow control valve.

17. A damping force adjusting type hydraulic shock absorber comprising:

a cylinder having a plurality of working chambers containing hydraulic fluid sealed therein;

a piston slidably fitted in said cylinder;

a piston rod including one end connected to said piston and an opposite end extending out of said cylinder;

an extending side primary passage for communicating between said working chambers so that the hydraulic fluid flows therebetween in one direction by sliding movement of said piston when said piston rod is in an extending stroke;

an extending side primary damping valve for controlling the flow of the hydraulic fluid in said extending side primary passage to generate a damping force and for adjusting the damping force in response to a change in pilot pressure;

an extending side secondary passage connected to said extending side primary passage to bypass said extending side primary damping valve;

an extending side constant orifice provided upstream of said extending side secondary passage;

an extending side variable orifice provided downstream of said extending side secondary passage;

a contracting side primary passage for allowing the hydraulic fluid to flow in one direction by sliding movement of said piston when said piston rod is in a compressing stroke;

a contracting side primary damping valve for controlling the flow of the hydraulic fluid in said contracting side primary passage to generate a damping force and for adjusting the damping force in response to a change in pilot pressure;

a contracting side secondary passage connected to said contracting side primary passage to bypass said contracting side primary damping valve;

a contracting side constant orifice provided upstream of said contracting side secondary passage;

a contracting side variable orifice provided downstream of said contracting side secondary passage;

said extending side primary damping valve including an extending side pilot line connected to said extending side secondary passage between said extending side constant orifice and said extending side variable orifice;

said contracting side primary damping valve including a contracting side pilot line connected to said contracting side secondary passage between said contracting side constant orifice and said contracting side variable orifice;

an extending side filter provided upstream of the portion of said extending side secondary passage to which said extending side pilot line is connected; and a contracting side filter provided upstream of the portion of said contracting side secondary passage to which said contracting side pilot line is connected.

18. A damping force adjusting type hydraulic shock absorber according to claim 17, further comprises a reservoir containing hydraulic fluid and gas sealed therein, wherein said piston divides the interior of said cylinder into an upper cylinder chamber and a lower cylinder chamber, and wherein said working chambers comprise said reservoir, said upper cylinder chamber, and said lower cylinder chamber.

19. A damping force adjusting type hydraulic shock absorber according to claim 18, wherein said extending side primary passage communicates between said upper cylinder chamber and said lower cylinder chamber, and wherein said contracting side primary passage communicates between said lower cylinder chamber and said reservoir.

20. A damping force adjusting type hydraulic shock absorber according to claim 19, wherein said piston includes an oil passage for communicating between said upper cylinder chamber and said lower cylinder chamber and a check valve for permitting only flow of the hydraulic fluid from said lower cylinder chamber to said upper cylinder chamber and preventing flow thereof from said upper cylinder chamber to said lower cylinder chamber, and wherein said lower cylinder chamber includes at the bottom portion thereof a base valve, said base valve having an oil passage for communicating between said lower cylinder chamber and said reservoir and a check valve for permitting only flow of the hydraulic fluid from said reservoir to said lower cylinder chamber and preventing flow thereof from said lower cylinder chamber to said reservoir.

* * * * *